United States Patent
Marquinez et al.

(10) Patent No.: US 11,514,816 B2
(45) Date of Patent: Nov. 29, 2022

(54) ADJUSTABLE VISUAL EFFECTS SIMULATING AUTO DARKENING LENSES IN AUGMENTED REALITY WELDING SYSTEMS

(71) Applicants: Pedro Marquinez, Annapolis, MD (US); William Joshua Becker, Manitowoc, WI (US); Pavel Gunia, Huelva (ES)

(72) Inventors: Pedro Marquinez, Annapolis, MD (US); William Joshua Becker, Manitowoc, WI (US); Pavel Gunia, Huelva (ES)

(73) Assignees: Illinois Tool Works Inc., Glenview, IL (US); Seabery North America Inc., Annapolis, MD (US)

( * ) Notice: Subject to any disclaimer, the term of this patent is extended or adjusted under 35 U.S.C. 154(b) by 476 days.

(21) Appl. No.: 16/279,625

(22) Filed: Feb. 19, 2019

(65) Prior Publication Data
US 2020/0265748 A1    Aug. 20, 2020

(51) Int. Cl.
*G09B 19/24* (2006.01)
*G02B 27/01* (2006.01)

(52) U.S. Cl.
CPC ......... *G09B 19/24* (2013.01); *G02B 27/0172* (2013.01); *G02B 2027/014* (2013.01); *G02B 2027/0118* (2013.01)

(58) Field of Classification Search
CPC ............... G09B 19/24; G02B 27/0172; G02B 2027/0118; G02B 2027/014
(Continued)

(56) References Cited

U.S. PATENT DOCUMENTS

| 4,931,018 A | 6/1990 | Herbst et al. |
| 7,024,342 B1 | 4/2006 | Waite et al. |

(Continued)

FOREIGN PATENT DOCUMENTS

| EP | 2863376 | 4/2015 |
| WO | 2007009131 | 1/2007 |
| WO | 2016144744 | 9/2016 |

OTHER PUBLICATIONS

International Searching Authority, "International Search Report and Written Opinion," issued in connection with International Patent Application No. PCT/US2020/018845, dated Aug. 25, 2020, 13 pages.
(Continued)

*Primary Examiner* — Hai Tao Sun
(74) *Attorney, Agent, or Firm* — McAndrews, Held & Malloy, Ltd.

(57) ABSTRACT

Apparatus, systems, and/or methods are disclosed relating to augmented reality welding systems. In some examples, an augmented reality welding system is configured to apply a visual effect to a simulated rendering of the augmented reality welding system when a simulated arc is present, so as to emulate an auto-darkening lens of a welding helmet. In some examples, the visual effect is impacted by several user adjustable settings. The settings may be adjusted by a user, such as via a helmet interface and/or the user interface of the augmented reality welding system, for example. In some examples, the settings may emulate auto-darkening settings found on conventional auto-darkening welding helmets (e.g., shade, sensitivity, and/or delay). In some examples, the settings may also include other settings unique to the augmented reality welding system, such as, for example a helmet model/type, a difficulty setting, a realism setting, and/or an effect area setting.

14 Claims, 7 Drawing Sheets

(58) Field of Classification Search
USPC .......................................................... 345/419
See application file for complete search history.

(56) References Cited

U.S. PATENT DOCUMENTS

| | | |
|---|---|---|
| 7,580,821 B2 | 8/2009 | Schirm et al. |
| 8,512,043 B2 | 8/2013 | Choquet |
| 8,747,116 B2 | 6/2014 | Zboray et al. |
| 9,101,994 B2 | 8/2015 | Albrecht |
| 9,269,279 B2 | 2/2016 | Penrod et al. |
| 9,368,045 B2 | 6/2016 | Becker |
| 9,583,023 B2 | 2/2017 | Becker et al. |
| 10,032,388 B2 | 7/2018 | Sommers et al. |
| 2008/0038702 A1 | 2/2008 | Choquet |
| 2015/0170539 A1 | 6/2015 | Chica Barrera et al. |
| 2016/0022496 A1* | 1/2016 | DeKeuster .......... G02F 1/13306 349/14 |
| 2016/0250723 A1 | 9/2016 | Albrecht et al. |
| 2016/0260261 A1* | 9/2016 | Hsu .......................... A61F 9/067 |
| 2016/0267806 A1* | 9/2016 | Hsu .......................... B23K 9/32 |
| 2018/0126476 A1 | 5/2018 | Meess et al. |
| 2018/0130376 A1* | 5/2018 | Meess .................. B23K 37/006 |

OTHER PUBLICATIONS

Aiteanu, Dorin, "Virtual and Augmented Reality Supervisor for a New Welding Helmet," Nov. 15, 2005, pp. 1-150.

Proceedings of the IIVV International Conference, "Safety and Reliability of Welded Components in Energy and Processing Industry," Jul. 10-11, 2008, 19 pages.

Catalina, et al., "Metallurigical and Materials Transactions," A Physical Metallurgy and Materials Science, vol. 35A, No. 5, May 2004, pp. 1421-1636.

Kobayashi, Kazuhiko, "Simulator of Manual Metal Arc Welding with Haptic Display," Chiba University, ICAT 2001, Dec. 2001, pp. 1-4.

Porter, Nancy C., et al., "Journal of Ship Production," The Society of Naval Architects and Marine Engineers, vol. 22, No. 3, Aug. 2006, 19 pages.

Wahi, K.K., et al., "Finite-Difference Simulation of a Multi-Pass Pipe Weld," Transactions of the 4th International Conference on Structural Mechanics in Reactor Technology, vol. L, Aug. 15-19, 1977, 18 pages.

* cited by examiner

ADJUSTABLE VISUAL EFFECTS SIMULATING AUTO DARKENING LENSES IN AUGMENTED REALITY WELDING SYSTEMS

TECHNICAL FIELD

The present disclosure generally relates to augmented reality welding systems and, more particularly, to adjustable visual effects that simulate auto darkening lenses in augmented reality welding systems.

BACKGROUND

Conventional arc welding systems generate electrical arcs that are bright enough to blind if viewed by the naked eye. Conventional welding helmets therefore provide shaded (and/or tinted) lenses to diminish the brightness. Some welding helmets have an auto-darkening lens that provides substantial shading (and/or darkening, tinting, etc.) only when exposed to a threshold level of light (e.g., from a bright electrical arc), while providing a largely unshaded viewing lens when exposed to lower light levels (e.g., from a light bulb).

Some augmented reality welding systems present welding simulations (e.g., for training) via a display screen. However, as there are no actual welding arcs, and/or associated bright visible light, simulating the shading and/or auto-darkening effects of welding helmets is more complicated.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to adjustable visual effects that simulate auto darkening lenses in augmented reality welding systems, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

The figures are not necessarily to scale. Where appropriate, the same or similar reference numerals are used in the figures to refer to similar or identical elements. For example, reference numerals utilizing lettering (e.g., camera 114a, camera 114b) refer to instances of the same reference numeral that does not have the lettering (e.g., cameras 114).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some examples of the present disclosure relate to a welding training system, comprising a display screen configured to display a simulated rendering and control circuitry configured to determine a visual effect based on one or more settings and a simulated arc state, and apply the visual effect to at least a portion of the simulated rendering. In some examples, the visual effect comprises a filter. In some examples, the filter reduces a brightness of at least a portion of the simulated rendering. In some examples, the filter is uniform or based on a spectral transmissivity curve. In some examples, the portion comprises at least one of a background, a foreground, an entirety, a weld area, a welding arc, or a weld pool of the simulated rendering. In some examples, the simulated arc state comprises a visible simulated arc or an absent simulated arc. In some examples, the one or more settings simulate settings of an auto-darkening welding helmet. In some examples, the one or more settings comprise one or more of a shade setting, a sensitivity setting, a helmet model setting, or a delay setting.

In some examples, the sensitivity setting sets an arc brightness threshold above which the visual effect applies a filter to the portion of the simulated rendering. In some examples, wherein the shade setting sets a filter level of the visual effect after an arc brightness threshold is reached. In some examples, the delay setting comprises a time delay between a change of the simulated arc state and a change of the visual effect. In some examples, the helmet model setting comprises a type of welding helmet, wherein the visual effect comprises a filter, and wherein the filter is based on a spectral transmissivity curve of the type of welding helmet. In some examples, the control circuitry is further configured to determine the visual effect based on one or more weld settings. In some examples, the one or more weld settings comprise one or more of a voltage, a current, a gas type, a wire feed speed, a workpiece material type, or a filler type. In some examples, the control circuitry is further configured to determine the visual effect based on a simulation difficulty setting.

In some examples, the system further comprises a simulated welding helmet having the display screen, wherein the simulated welding helmet comprises a camera configured to capture images of a surrounding environment. In some examples, the control circuitry is further configured to receive the images from the camera, detect one or more weld settings of the welding training system, and generate the simulated rendering based on the images and the one or more weld settings.

Some examples of the present disclosure relate to a method, comprising determining, via control circuitry, a visual effect based on one or more settings and a simulated arc state, applying, via the control circuitry, the visual effect to a simulated rendering, and displaying the simulated rendering on a display screen. In some examples, applying the visual effect comprises filtering a brightness of at least a portion of the simulated rendering, wherein the portion comprises a background, a foreground, an entirety, a weld area, a welding arc, or a weld pool of the simulated rendering. In some examples, the one or more settings comprise one or more of a shade setting, a sensitivity setting, a helmet model setting, or a delay setting.

Some examples of the present disclosure relate to augmented reality welding systems. In some examples, an augmented reality welding system has a display screen configured to display a simulated rendering, such as display screen of a welding helmet worn by the user. The simulated rendering may be based on recorded images of a surrounding environment, such as recorded by one or more cameras configured to record images. In some examples, the recorded images are processed and/or augmented by an augmented reality computing system to create the simulated rendering. In some examples, the simulated rendering includes more or fewer images and/or details (e.g., relating to an arc, a workpiece, a welding torch, etc.) than the images recorded by the cameras. In some examples, the simulated rendering is presented to a user via the display screen.

In some examples, the computing system is further configured to add a visual effect to the simulated rendering when the simulated rendering includes images related to an augmented and/or simulated arc. In some examples, the visual effect is a filtering effect that filters some or all of the bright light associated with the augmented and/or simulated arc. In some examples, the visual effect is designed to enhance the reality of the augmented reality welding system by emulating a filtering, shading, tinting, and/or darkening effect of actual welding helmets when an actual arc is present.

In some examples, the augmented reality system further includes one or more settings that impact the visual effect. Some of the settings may be similar to settings that sometimes appear on actual welding helmets, such as, for example, a shade setting, a sensitivity setting, and/or a delay setting. In some examples, additional settings specific to the augmented reality welding system are provided, such as, for example, a welding helmet model setting and/or a difficulty or realism setting. These settings may allow a user to adjust and/or customize the augmented reality welding experience. In some examples, the computing system may apply the visual effect to the simulated rendering based on the one or more settings.

Figure 1:
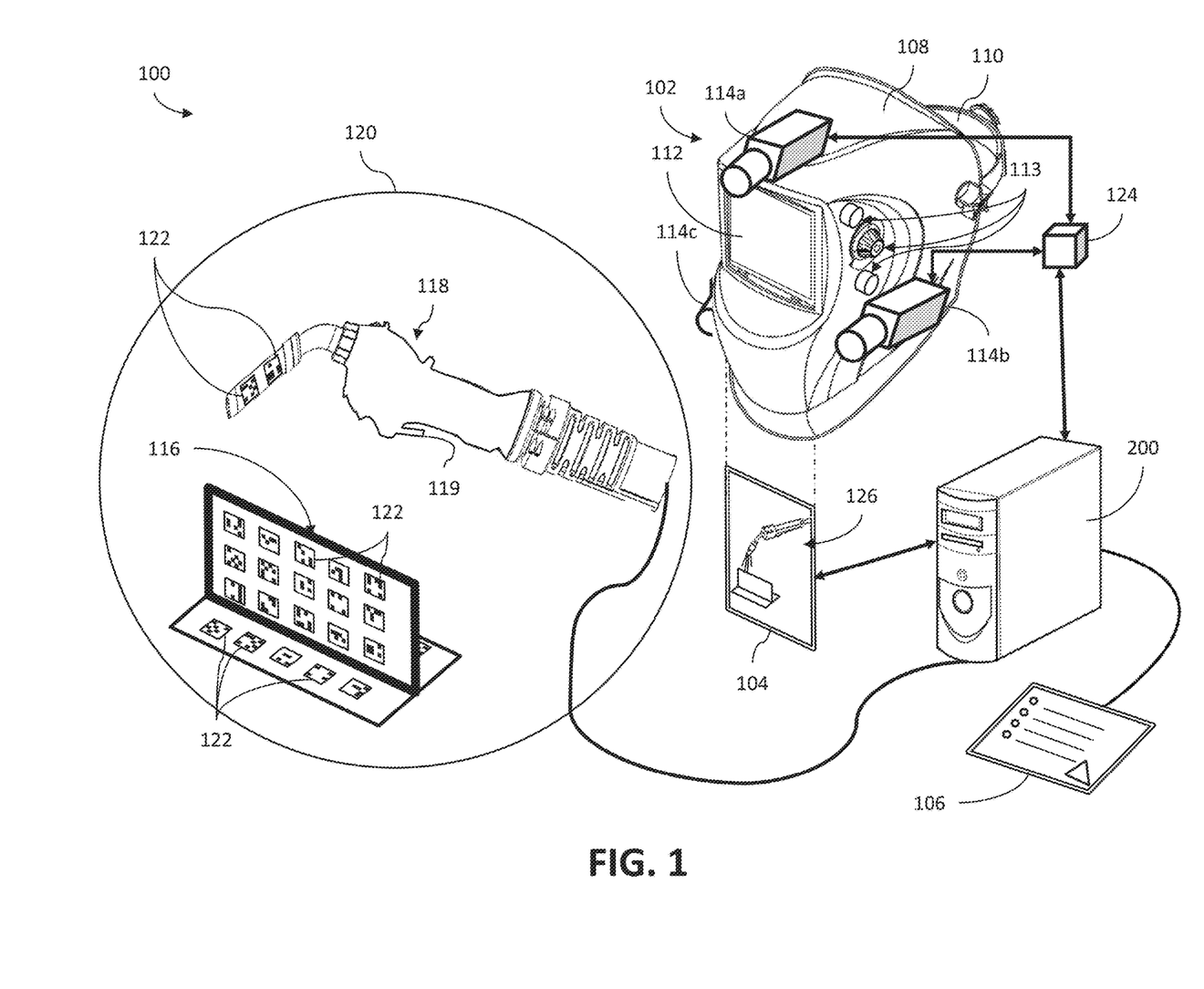
FIG. 1 is a diagram illustrating components of an example augmented welding system, in accordance with aspects of this disclosure.

FIG. 1 shows an example of an augmented reality welding system 100. While the present disclosure sometimes refers to just augmented reality for simplicity, it should be understood that features of the augmented reality welding system 100 may also be implemented in a mixed reality welding system and/or a virtual reality welding system. In some examples, the augmented reality welding system 100 may be used for weld training.

In the example of FIG. 1, the augmented reality welding system 100 includes a simulated welding helmet 102, a computing system 200, a display screen 104 in communication with the computing system 200, and a user interface 106 in communication with the computing system 200. As shown, the simulated welding helmet 102 includes an outer shell 108, a headband 110, a faceplate 112, and a helmet interface 113. In some examples, the headband 110 is configured to secure the simulated welding helmet 102 to the head of a user, while the outer shell 108 is configured to retain the faceplate 112 and protect the head of the user. However, in some examples, the simulated welding helmet 102 may appear substantially differently. For example, the simulated welding helmet 102 may simply simulate a conventional welding helmet, without including features such as the outer shell 108, headband 110, faceplate 112, and/or helmet interface 113.

In the example of FIG. 1, an electronic display screen 104 is secured within simulated welding helmet 102 (such as within the outer shell 108, for example), such that the display screen 104 is viewable by a user (e.g., a trainee and/or operator) when the simulated welding helmet 102 is worn on the head of the user. In some examples, the electronic display screen 104 may be removably secured within the simulated welding helmet 102 (such as within the outer shell 108, for example). In some examples, the electronic display screen 104 may be part of a separate component (e.g., specialized glasses) that is secured to the outer shell 108. In some examples, the electronic display screen 104 may be part of the faceplate 112, and/or vice versa. In some examples, the electronic display screen 104 may be entirely separate from the simulated welding helmet 102.

In the example of FIG. 1, the simulated welding helmet 102 further includes one or more cameras 114 affixed to the outer shell 108. In some examples, the cameras 114 may be digital video cameras. As shown, there are three cameras 114 affixed to the outer shell 108: one camera 114a on top of the simulated welding helmet 102, one camera 114b on the left side, and one camera 114c on the right side. The cameras 114 are arranged in a triangle configuration so as to increase the accuracy of depth and/or three dimensional spatial calculations, such as by the computing system 200, for example. In some examples, there may be less or more cameras 114. In some examples, only two cameras 114 may be needed to facilitate depth and/or spatial calculations. In the example of FIG. 1, the cameras 114 are directed forward, in the same direction a user wearing the simulated welding helmet 102 would be looking. In some examples, the cameras 114 may be movably mounted, and/or have movable lenses configured to redirect a focus (and/or adjust certain attributes) of the cameras 114, in response to one or more command signals (e.g., received from computing system 200 and/or camera controller(s) 124). In some examples, the cameras 114 may be otherwise positioned on the simulated welding helmet 102 and/or disconnected from the simulated welding helmet 102 entirely.

In the example of FIG. 1, the cameras 114 are directed towards a workpiece 116 and welding torch 118 within a welding area 120 (and/or welding cell). In some examples, the welding torch 118 may be a real, functional, welding torch. In some examples, the welding torch 118 may instead be a mock welding torch. In some examples, the welding torch 118 may be a gun or torch configured for gas metal arc welding (GMAW) or an electrode holder (i.e., stinger) configured for shielded metal arc welding (SMAW). In the example of FIG. 1, the welding torch 118 is in communication with the computing system 200. In some examples, the welding torch 118 may additionally, or alternatively, be in communication with some other system (e.g., a mock or actual welding power supply and/or mock or actual welding wire feeder) that may (or may not) be in communication with the computing system 200.

As shown, the workpiece 116 and welding torch 118 within the welding area 120 include markers 122 configured to be captured by the cameras 114 and/or interpreted by the computing system 200. In some examples, other welding components and/or items (e.g., clamps, electrode holders, wire feeders, power supplies, electrodes, other workpieces, tips, nozzles, etc.), with or without markers 122, may also be positioned within the welding area 120. In operation, the cameras 114 are configured to record images of the welding area 120 and encode data representative of the images into one or more image signals.

In the example of FIG. 1, a camera controller 124 is configured to collect image signals from the cameras 114. In some examples, the image signals may be representative of images recorded by the cameras 114. As shown, the camera controller 124 is configured to send the image signals, or data representative of the image signals and/or the recorded images, to the computing system 200. The computing system 200 is configured to process the images, augment the images to create a simulated rendering 126, and send the simulated rendering 126 to the display screen 104 for display to the user.

In some examples, each camera 114 has its own camera controller 124. In some examples, the camera controller 124 is part of the simulated welding helmet 102. In some examples, the camera controller 124 is separate from the simulated welding helmet 102. In some examples, the computing system 200 is integrated into the simulated welding helmet 102. In some examples, the cameras 114, camera controller 124, display screen 104, helmet interface 113, user interface 106, welding torch 118, and/or computing system 200 may communicate via one or more wired mediums and/or protocols (e.g., Ethernet cable(s), universal serial bus cable(s), other signal and/or communication cable(s)) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 1, the computing system 200 is configured to create the simulated rendering 126 based on the images captured by the cameras 114 in conjunction with one or more user adjustable settings and/or inputs. In some examples, inputs may be received from certain welding components (e.g., trigger 119 of the welding torch 118) as well as from the helmet interface 113 and/or the user interface 106. In some examples, the helmet interface 113 may be considered part of the user interface 106.

In some examples, the augmented reality welding system 100 is configured to apply an additional visual effect to the simulated rendering 126. In some examples, the visual effect is impacted by several user adjustable settings. Some of the settings emulate auto-darkening settings found on conventional auto-darkening welding helmets (e.g., shade, sensitivity, and/or delay). Other settings are unique to the augmented reality welding system 100, such as, for example, a helmet model/type setting, a difficulty setting, a realism setting, and/or a visual effect area setting. In some examples, the visual impact may further be impacted by one or more weld settings (e.g., a voltage, a current, a gas type, a wire feed speed, a workpiece material type, and/or a filler type). The settings are discussed further below with respect to FIG. 2. The settings may be adjusted by a user via the user interface 106 and/or the helmet interface 113.

In the example of FIG. 1, the helmet interface 113 includes one or more adjustable inputs (e.g., knobs, buttons, switches, keys, etc.) and/or outputs (e.g., lights, speakers, etc.). In some examples, the helmet interface 113 is in communication with the computing system 200. In some examples, the helmet interface 113 may further comprise communication circuitry (not shown) configured for communication with computing system 200. In some examples, the helmet interface 113 may be part of the user interface 106.

In the example of FIG. 1, the user interface 106 is in communication with the computing system 200. As shown, the user interface 106 comprises a touch screen interface, such as a tablet, touch screen computer, smartphone or other touch screen device. In some examples, the user interface 106 may instead comprise more traditional input devices (e.g., mouse, keyboard, buttons, knobs, etc.) and/or output devices (e.g., display screen, speakers, etc.). In some examples, the user interface 106 may further include one or more receptacles configured for connection to (and/or reception of) one or more external memory devices (e.g., floppy disks, compact discs, digital video disc, flash drive, etc.).

In the example of FIG. 1, the computing system 200 also uses camera-captured images of markers 122 on the welding torch 118 and/or workpiece 116 (and/or other components) to create the simulated rendering 126. In some examples, the computing system 200 may be configured to recognize the markers 122 on the workpiece 116 and/or welding torch 118, and create a simulated rendering based (at least in part) on the markers 122. For example, the markers 122 may assist the computing system 200 in tracking and/or recognition of the welding torch 118, workpiece 116, and/or other objects, as well as their respective shapes, sizes, spatial relationships, etc. In some examples, the computing system 200 may combine recognition of markers 122 with user input to create the simulated rendering 126. For example, the computing system 200 may recognize markers 122 on the welding torch 118 near markers 122 on the workpiece 116 and, after recognizing that the user is pressing a trigger 119 of the welding torch 118, create a simulated rendering showing an arc between the welding torch 118 and the workpiece 116, and/or a weld pool proximate the arc endpoint on the workpiece 116. In some examples, the computing system 200 is configured to omit the markers 122 from the simulated rendering 126.

Figure 2:
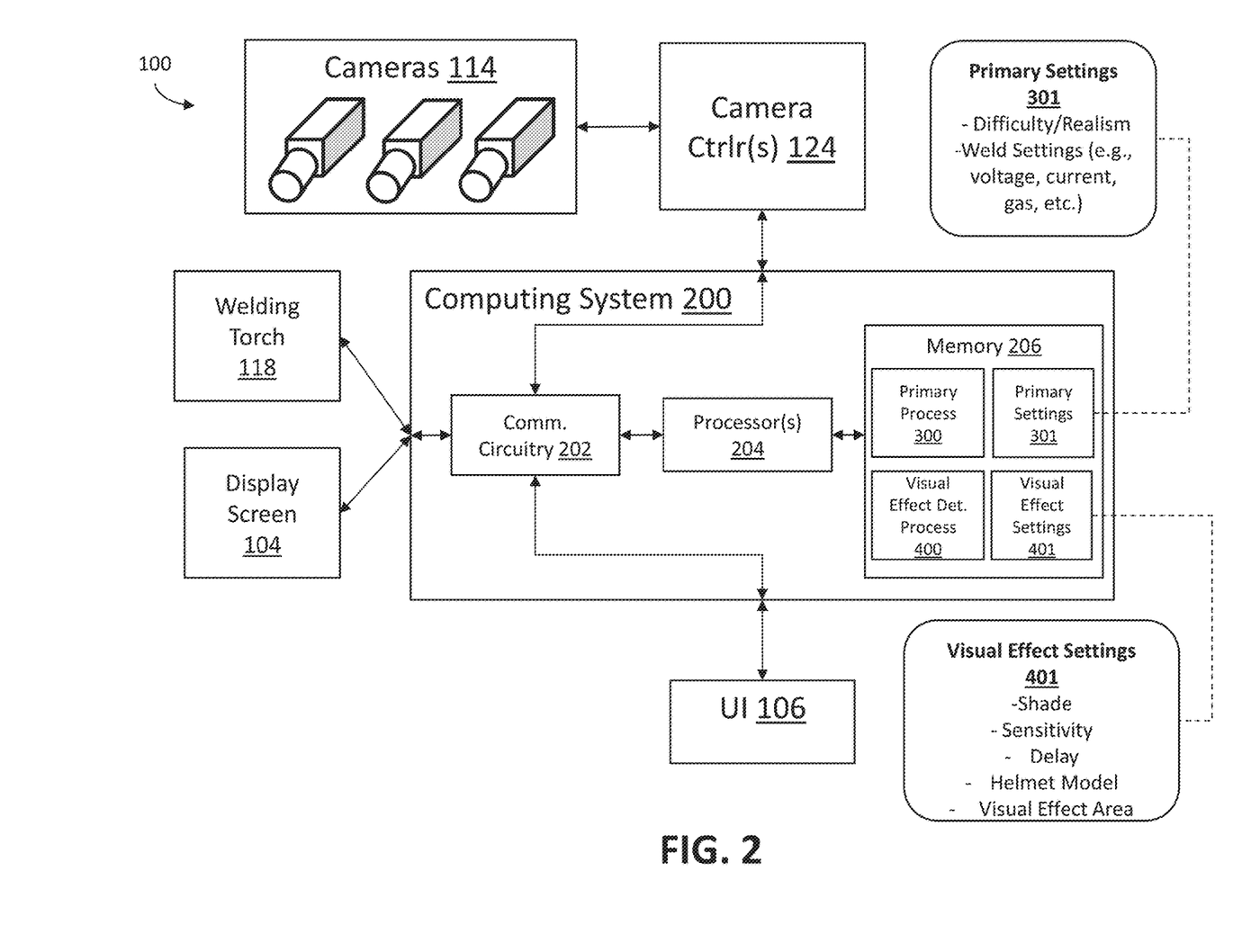
FIG. 2 is a block diagram further illustrating the components of the example augmented welding system of FIG. 1, in accordance with aspects of this disclosure.

FIG. 2 is a block diagram of the augmented reality welding system 100 of FIG. 1. In the example of FIG. 2, the computing system 200 is in communication with the user interface 106 (and/or helmet interface 113), the display screen 104, one or more welding components (e.g., welding torch 118, welding wire feeder, welding power supply, etc.), and the cameras 114 (e.g., through the camera controller(s) 124). In some examples, the cameras 114 may be in direct communication with the computing system 200 without going through the camera controller(s) 124. As shown, the computing system 200 includes communication circuitry 202 configured to facilitate communication between the computing system and the user interface 106 (and/or helmet interface 113), the display screen 104, one or more welding components (e.g., welding torch 118), and the cameras 114 (e.g., through the camera controller(s) 124).

In the example of FIG. 2, the computing system 200 also includes memory 206 and one or more processors 204. As shown, the memory 206, processor(s) 204, and communication circuitry 202 are in electrical communication with each another, such as through a common data bus. The one or more processors 204 are configured to execute instructions stored in the memory 206. In the example of FIG. 2, the memory 206 stores executable instructions that, when executed by the processor, further operation of the augmented reality welding system 100. As shown, the memory 206 stores instructions relating to at least two processes of the augmented reality welding system 100: a primary control process 300 and a visual effect determination process 400.

In the example of FIG. 2, the memory 206 also stores data that may be used by the primary control process 300 and/or visual effect determination process 400. In particular, as shown, the memory 206 stores primary settings 301 (e.g., such as may be relevant to the primary control process 300) and visual effect settings 401 (e.g., such as may be relevant to the visual effect determination process 400). In some examples, the primary settings 301 may include such settings as a (training) difficulty setting (e.g., easy, normal, hard, etc.), a realism setting (e.g., low, medium, high, etc.), and/or various weld settings (e.g., voltage, current, gas type, wire feed speed, workpiece material type, filler type, etc.). In some examples, the visual effect settings 402 may include such settings as a shade setting (e.g., low, medium, high or 1, 2, 3, 4, 5, etc.), a sensitivity settings (e.g., low, medium, high or 1, 2, 3, 4, 5, etc.), a delay setting (e.g., low, medium, high or 1, 2, 3, 4, 5, etc.), a helmet model/type setting, and/or a visual effect area setting (e.g., localized, expanded, entire, background, foreground, weld area, welding arc, weld pool, etc.). In some examples, the primary settings 302, visual effect settings 402, and/or other data stored in memory may be used by the primary control process 300 and/or visual effect determination process 400. In some examples, the primary control process 300, visual effect determination process 400, primary settings 302, visual effect settings 402, and/or other data used by the augmented reality welding system 100 may be retrieved from an external memory device (e.g., flash drive, cloud storage, etc.) instead of, or in addition to, being stored in memory 206.

Figure 3:
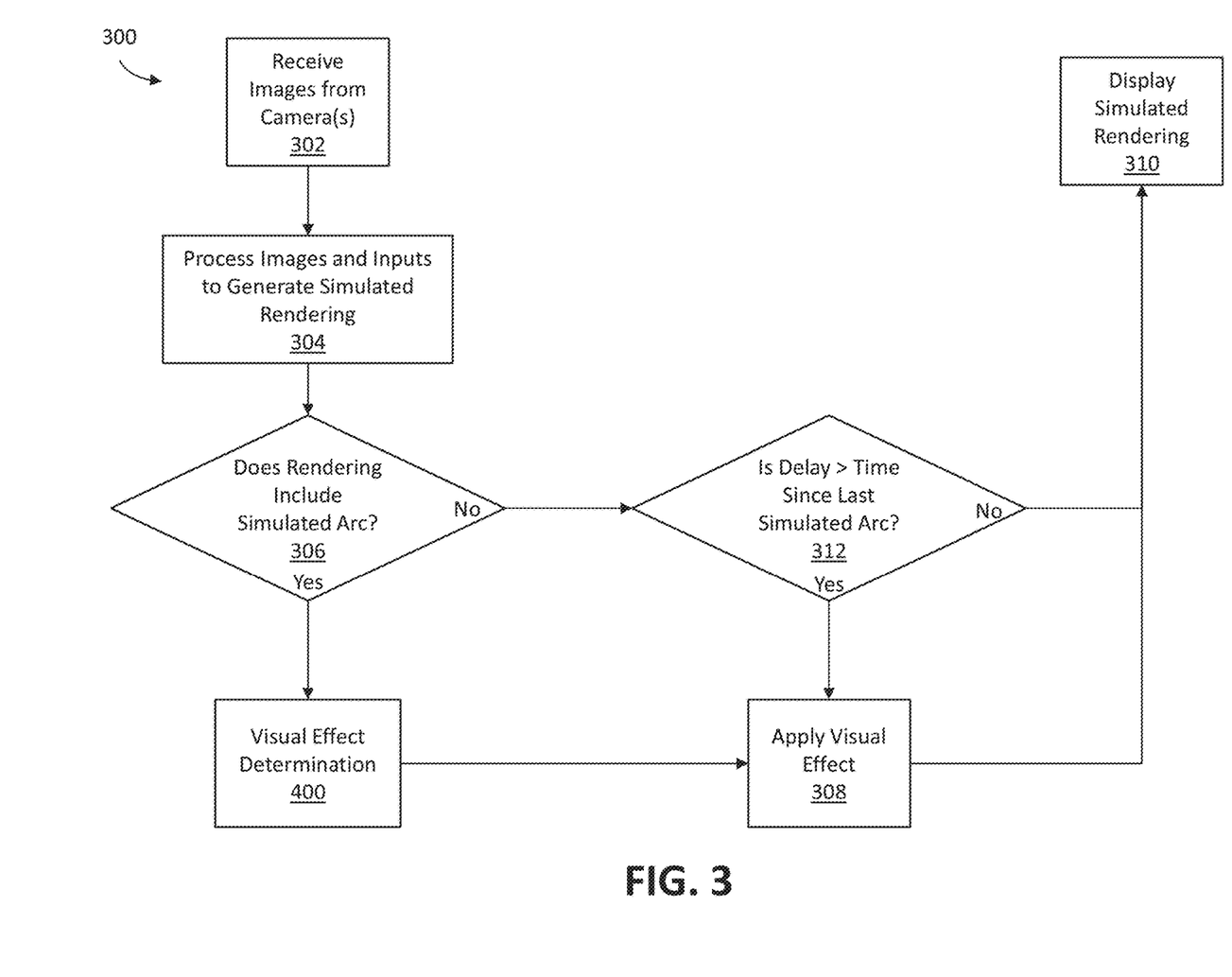
FIG. 3 is a flow diagram illustrating an example primary control process that may be used with the example augmented welding system of FIGS. 1 and 2, in accordance with aspects of this disclosure.

FIG. 3 is a flowchart illustrating an example primary control process 300 of the augmented reality welding system 100. In some examples, some or all of the primary control process 300 may be implemented in machine readable instructions stored in memory 206 and/or executed by the one or more processors 204. In some examples, some or all of the primary control process 300 may be implemented in analog and/or discrete circuitry. In some examples, the primary control process 300 is configured to control the augmented reality welding system 100, such as by processing the images captured by cameras 114 along with the various inputs and/or settings to generate the simulated rendering 126 displayed to the user via the display screen 104.

In the example of FIG. 3, the primary control process 300 begins at block 302, where the computing system 200 receives one or more images (and/or image signals) from the cameras 114 (and/or camera controller(s) 124). At block 304, the primary control process 300 processes the images along with inputs of the augmented reality welding system 100 and generates the simulated rendering 126. In some examples, processing the images may comprise parsing the images to determine and/or recognize objects in the image, as well as properties of the objects. Markers 122 on certain objects (e.g., welding torch 118 and/or workpiece 116) may assist in this processing. For example, while the actual workpiece 116 may be a piece of plastic, the primary control process 300 may recognize the workpiece 116 from the markers 122 (and/or other distinguishing characteristics) and render the workpiece 116 as a metallic workpiece (or some other workpiece type, depending on weld settings, etc.). In some examples, the primary control process 300 may further render the workpiece 116 as having completed welds in some places and uncompleted welds in other places, according to inputs and/or settings of the augmented reality welding system 100. As another example, the primary control process 300 may recognize the welding torch 118 and workpiece in proximity to one another, detect a signal from the welding torch 118 indicating that the trigger 119 is being pressed, and in response render an arc extending from a torch tip of the welding torch 118 to the workpiece 116, along with an associated weld pool on the workpiece 116 at the end of the arc.

In the example of FIG. 3, the primary control process 300 determines whether the simulated rendering 126 includes a visible simulated arc at block 306. In some examples, this determination is based, at least in part, on inputs and/or settings (e.g., weld settings) of the augmented reality welding system 100. If the primary control process 300 determines that there is a visible simulated arc in the simulated rendering 126, then the primary control process 300 proceeds to execute the visual effect determination process 400 at block 400 (discussed further below in reference to FIG. 4). After block 400, the primary control process 300 proceeds to block 308 where the visual effect is applied to the simulated rendering 126, and then to block 310 where the simulated rendering 126 is sent to the display screen 104 and displayed to the user.

In the example of FIG. 3, if the primary control process 300 determines that there is no visible simulated arc (or an absent simulated arc) in the simulated rendering 126, the primary control process 300 proceeds from block 306 to block 312. At block 312, the primary control process 300 reads the visual effect settings 401 and determines whether the set time delay is greater than the time since last there was a simulated arc in the simulated rendering 126. The determination at block 312 emulates some real life auto-darkening welding helmets with delay settings that provide the option of continuing to apply the shading (and/or tinting, darkening, etc.) effect to the welding helmet lens for some time after the welding arc (or other sufficiently bright light) has subsided. As shown, if the set time delay is less than the time since last there was a simulated arc in the simulated rendering 126 then the primary control process 300 proceeds to block 310, where the simulated rendering 126 is sent to the display screen 104 and displayed to the user, without any visual effect applied. If the set time delay is greater than the time since last there was a simulated arc in the simulated rendering 126 then the primary control process 300 proceeds to block 308, where the most recent visual effect is again applied to the simulated rendering 126 before the simulated rendering 126 is sent to the display screen 104 and displayed to the user at block 310.

Figure 4:
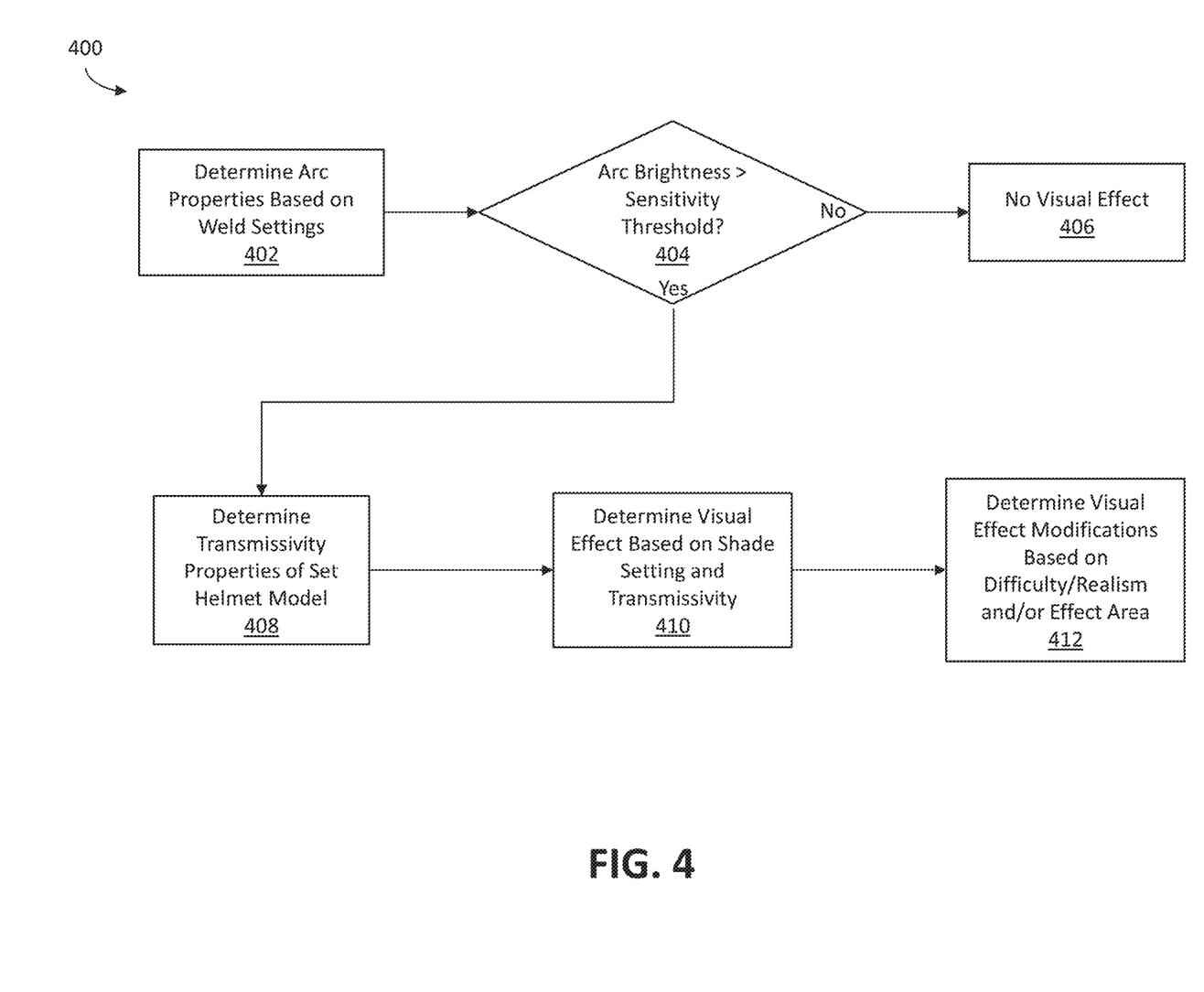
FIG. 4 is a flow diagram illustrating an example visual effect determination process that may be used with the example primary control process of FIG. 4, in accordance with aspects of this disclosure.

FIG. 4 is a flowchart illustrating the visual effect determination process 400 of the augmented reality welding system 100. In some examples, some or all of the visual effect determination process 400 may be implemented in machine readable instructions stored in memory 206 and/or executed by the one or more processors 204. In some examples, some or all of the visual effect determination process 400 may instead be implemented in analog and/or discrete circuitry. In some examples, the visual effect determination process 400 is configured to determine a visual effect to apply to the simulated rendering 126 to simulate the shading (and/or tinting, darkening, etc.) effect of some real life welding helmet lenses.

In the example of FIG. 4, the visual effect determination process 400 begins at block 402, where properties of the simulated arc are determined. In some examples, determining properties of the simulated arc may comprise determining (and/or estimating) an amount and/or brightness of visible light radiation that an actual welding arc would produce given the weld settings of the augmented reality welding system 100. For example, the determined brightness of an arc with low current and/or voltage weld settings may be less than the determined brightness of an arc with high current and/or voltage weld settings. In some examples, the primary control process 300 may determine properties of the simulated arc at block 304 of the primary control process 300, and the visual effect determination process 400 may use the properties at block 402. For example, the primary control process 300 may save the arc properties to memory 206 at block 304, and the visual effect determination process 400 may read and/or load the arc properties from memory 206 at block 402.

In the example of FIG. 4, the visual effect determination process 400 determines whether the determined brightness of the simulated arc is greater than a sensitivity threshold. In some examples, the sensitivity threshold is based on the sensitivity setting of the visual effect settings 401. In some examples, the brightness of other elements (e.g., the weld pool) of the simulated rendering (and/or the entire simulated rendering) is evaluated against the sensitivity threshold. As shown, the visual effect determination process 400 proceeds to block 406 if the brightness is less than the sensitivity threshold. At block 406, the visual effect determination process 400 determines the visual effect to be nothing. If, however, the brightness is greater than the set sensitivity threshold, the visual effect determination process 400 proceeds to block 408.

In the example of FIG. 4, the visual effect determination process 400 determines one or more spectral transmissivity properties corresponding to the helmet model/type setting at block 408. Spectral transmissivity properties impact certain aspects of the visual effect, such as how much light of a given wavelength is allowed to pass. Actual welding helmet have different lenses with different filters, each with different spectral transmissivity properties. For example, some actual welding helmets have lenses that slightly color (e.g., with a slight green tint, a slight yellowish color, etc.) the appearance of everything viewed through the lens because of the spectral transmissivity properties of the lens' filter. In some examples, one or more of the spectral transmissivity properties may be dependent upon the shade setting, such that one or more of the spectral transmissivity properties may vary with respect to different shade settings.

Figure 5:
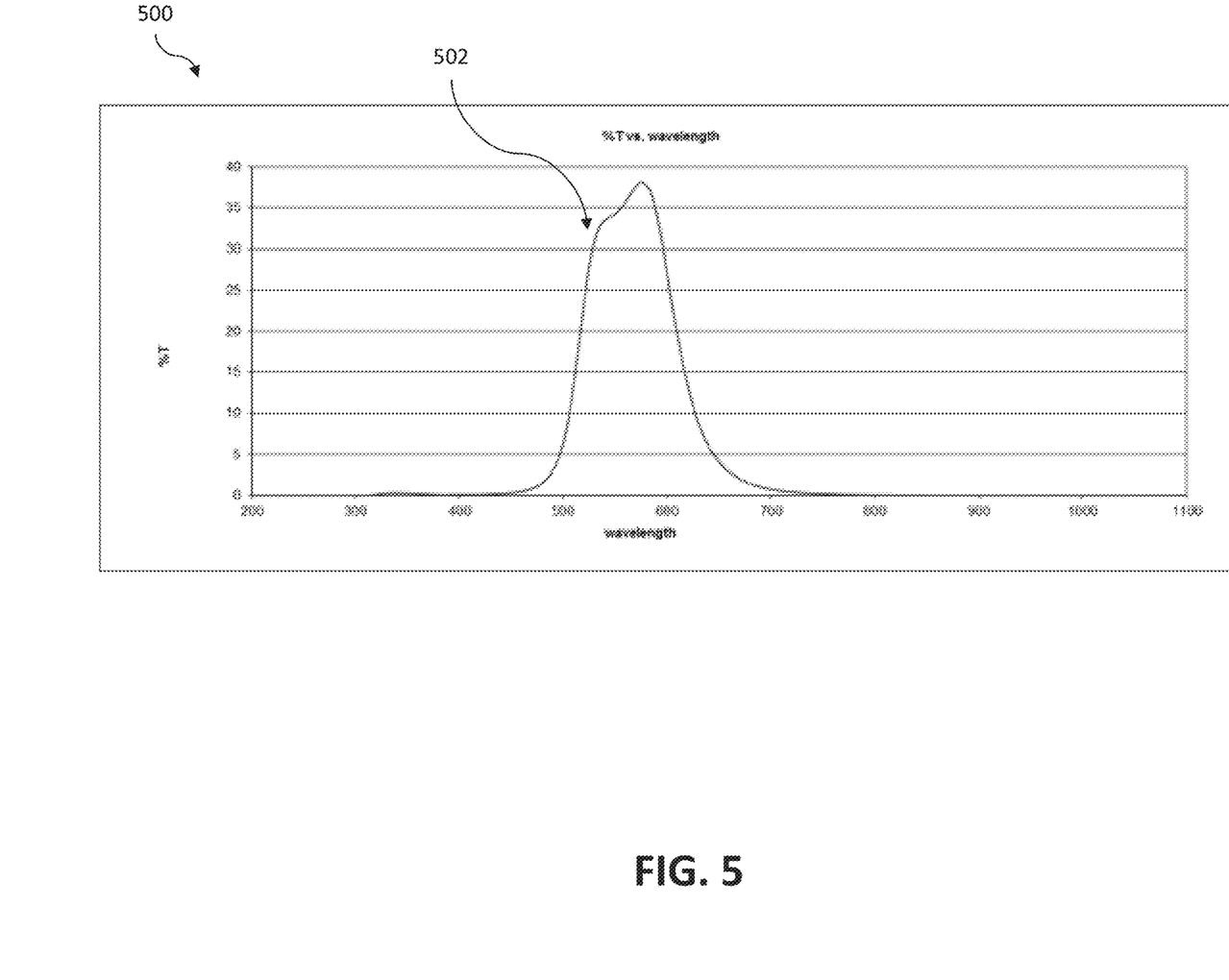
FIG. 5 is a graph illustrating an example spectral transmissivity curve, in accordance with aspects of this disclosure.

FIG. 5 is a graph 500 showing example spectral transmissivity properties of an example filter via a transmissivity curve 502. In the example of FIG. 5, the Y axis of the graph 500 represents transmissivity percentage, or a percentage of light that such an example filter would allow through, while the X axis represents wavelength of light (in nanometers). The spectral transmissivity curve 502 is a mathematical representation of the properties of the example filter, showing which wavelengths of light are filtered only slightly, and which wavelengths of light are filtered entirely (or substantially). As shown, the spectral transmissivity curve 502 indicates that almost all light having a wavelength less than 450 nanometers, or greater than 750, is filtered. In the example of FIG. 5, the spectral transmissivity curve 502 indicates that most of the light allowed through the filter will be in the 500 to 700 nanometer range, with up to approximately 38% of light having wavelengths around approximately 580 nanometers allowed through the filter. Thus, this example filter may lend a slightly yellowish color to the appearance of everything viewed through the filter, because of the spectral transmissivity properties.

In the example of FIG. 4, the spectral transmissivity properties are determined at block 408 based on the helmet model setting of the visual effect settings 401, which identifies a particular type and/or model of real life welding helmet filter for the visual effect to emulate. In some examples, the determination may comprise utilizing a data structure that associates different helmet models with different spectral transmissivity properties. In some examples, the spectral transmissivity properties may be disabled or determined to be uniform, corresponding to a flat filter where the same amount of light is allowed to pass through regardless of wavelength. For example, spectral transmissivity may be disabled or determined to be uniform for lower difficulty and/or realism settings.

In the example of FIG. 4, the visual effect determination process 400 proceeds to block 410 after block 408. At block 410, the visual effect determination process 400 determines the visual effect to apply to the simulated rendering 126 based on the previously determined spectral transmissivity properties and the shade setting of the visual effect settings 401. In some examples, the shade setting impacts the degree to which brightness is filtered (and/or shaded, tinted, darkened, etc) by the visual effect. In some examples, the higher the shade setting, the more brightness is filtered (and/or shaded, tinted, darkened, etc) by the visual effect.

Figure 6A:
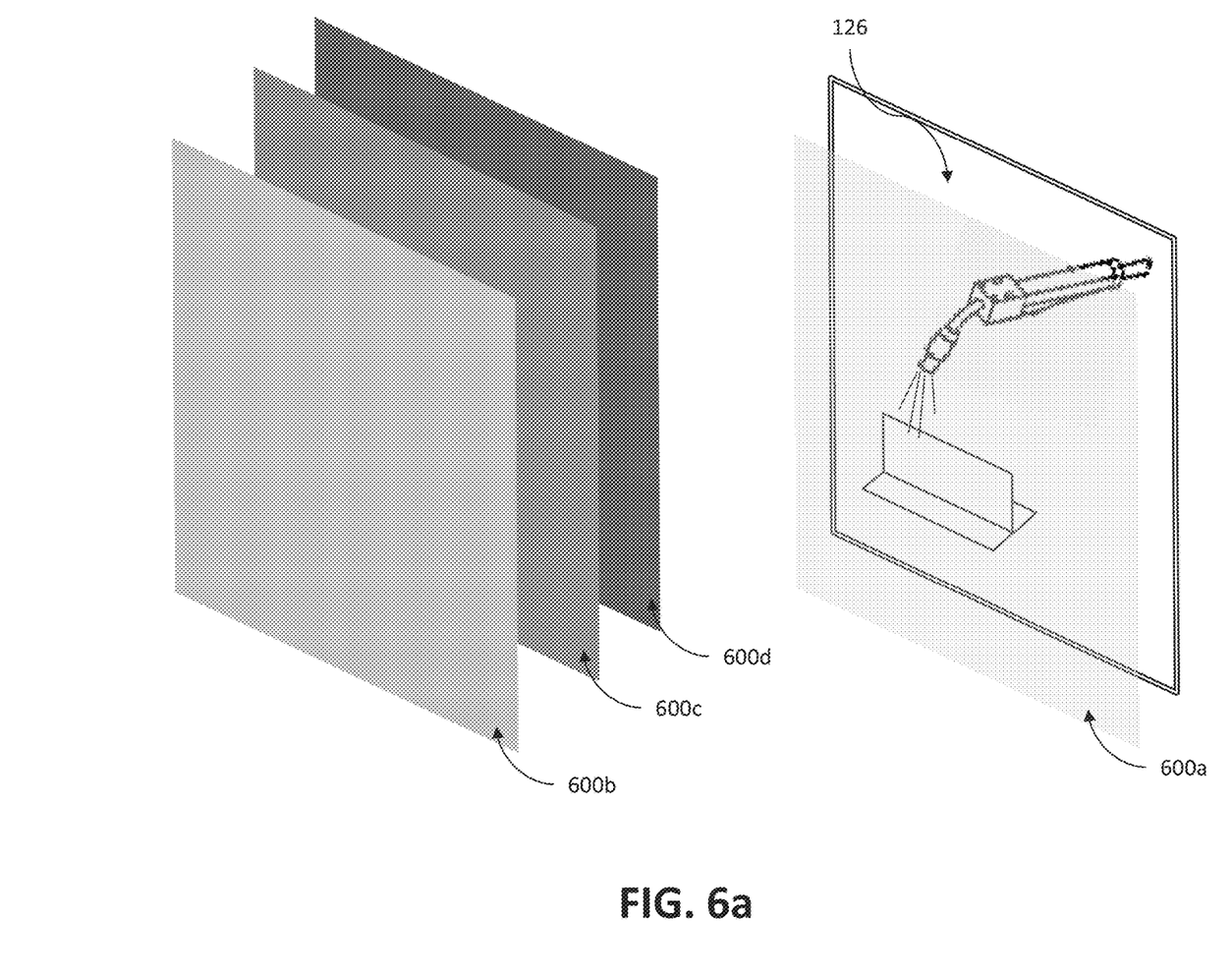
FIGS. 6a and 6b are diagrams illustrating example applications of a visual effect to a simulated rendering, in accordance with aspects of this disclosure.

FIG. 6a illustrates an example of different visual effects 600 with different shade settings, with visual effect 600a corresponding to the lowest shade setting, and visual effect 600d corresponding to the highest shade setting (everything else being equal). FIG. 6a illustrates the visual effect 600 as a shading of sorts that is added on top of the simulated rendering 126 for ease of understanding. However, in some examples the visual effect may actually be a subtraction and/or reduction of certain visual attributes (e.g., brightness) of all or some of the simulated rendering 126. In the example of FIG. 6a, only the visual effect 600a is applied to the simulated rendering 126, while the other visual effects 600b-600d are not applied due to the visual effect settings 401. While FIG. 6a shows four different visual effects 600 corresponding to shade settings, in some examples there may be more or less shade settings and/or corresponding visual effects.

Figure 6B:
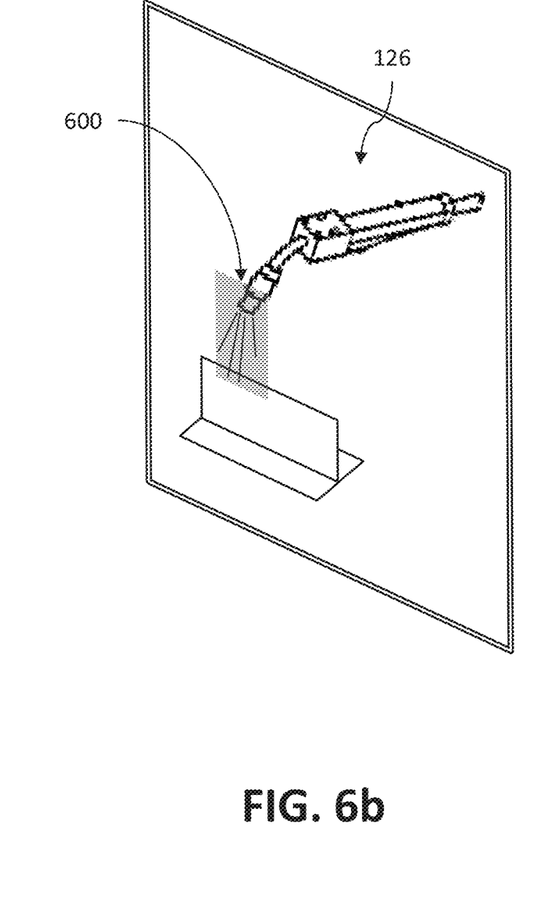

In the example of FIG. 4, the visual effect determination process 400 proceeds to block 412 after block 410. At block 412, the visual effect determination process 400 determines if any modification to the visual effect 600 is warranted given the difficulty, realism, and/or effect area settings of the visual effect settings 401. In some examples, certain difficulty and/or realism settings may correspond to certain visual effect area settings. For example, an easy difficulty and/or low realism setting may correspond to a small and/or localized visual effect area (or no visual effect area). A small and/or localized visual effect area may apply the visual effect 600 only to a small and/or localized area around the simulated arc, such as shown, for example in FIG. 6b. In some examples, this would allow the user to view the rest of the simulated rendering 126, away from the arc, without any visual effect. As another example, a hard difficulty and/or high realism setting may correspond to a full visual effect area that applies the visual effect to the entire simulated rendering 126, such as shown, for example, in FIG. 6a. While the visual effect 600 in FIG. 6b is depicted as having a sharp, abrupt, edge between the portions of the simulated rendering 126 with and without the visual effect 600, in some examples, the transition may be smoothed.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding training system, comprising:
 a display screen configured to display a simulated rendering; and
 control circuitry configured to:
  determine whether the simulated rendering includes a simulated arc,
  determine a threshold based on a sensitivity setting,
  in response to determining the simulated rendering includes the simulated arc, determine whether a simulated brightness of the simulated arc is greater than the threshold,
  in response to determining the simulated brightness of the simulated arc is greater than the threshold,
   determine a visual effect to apply to the simulated rendering based on a shade setting or a helmet model setting,
   determine a size or location of a portion of the simulated rendering to which the visual effect will be applied based on a realism setting or a difficulty setting, and
   apply the visual effect to at least the portion of the simulated rendering.

2. The system of claim 1, wherein the visual effect comprises a filter effect.

3. The system of claim 2, wherein the filter effect reduces the simulated brightness of at least a portion of the simulated rendering.

4. The system of claim 2, wherein the control circuitry is configured to:
   determine whether the filter effect should simulate a uniform spectral transmissivity or a non-uniform spectral transmissivity based on a difficulty setting or a realism setting, and
   apply the filter effect according to the determination.

5. The system of claim 1, wherein the portion comprises at least one of a background, a foreground, an entirety, a weld area, a welding arc, or a weld pool of the simulated rendering.

6. The system of claim 1, wherein the visual effect simulates a darkening effect of an auto-darkening welding helmet.

7. The system of claim 1, wherein the control circuitry is further configured to determine the visual effect based on the simulation realism setting.

8. The system of claim 3, wherein the control circuitry is further configured to determine a degree to which to reduce the simulated brightness based on the shade setting, and apply the filter effect according to the determination.

9. The system of claim 1, wherein, in response to determining the simulated rendering does not include the simulated arc, the control circuitry is further configured to apply the visual effect in response to determining that a time since the simulated rendering last included the simulated arc is less than a delay setting.

10. The system of claim 1, wherein the control circuitry is configured to determine the visual effect to apply to the simulated rendering based on the helmet model setting, the helmet model setting comprises a type of welding helmet, the visual effect comprises a filter effect, and the filter effect is based on a spectral transmissivity curve of the type of welding helmet.

11. The system of claim 1, wherein the control circuitry is further configured to determine the visual effect based on one or more weld settings.

12. The system of claim 11, wherein the one or more weld settings comprise one or more of a voltage, a current, a gas type, a wire feed speed, a workpiece material type, or a filler type.

13. The system of claim 1, wherein the control circuitry is further configured to determine the visual effect based on the simulation difficulty setting.

14. The system of claim 1, further comprising a simulated welding helmet having the display screen, control circuitry, and a camera configured to capture images of a surrounding environment, the control circuitry being further configured to:
   receive the images from the camera;
   detect one or more weld settings of the welding training system; and
   generate the simulated rendering based on the images and the one or more weld settings.

* * * * *